United States Patent [19]

Fey et al.

[11] 4,042,802

[45] Aug. 16, 1977

[54] THREE-PHASE ARC HEATER

[75] Inventors: Maurice G. Fey, Plum Borough; Charles B. Wolf, Irwin, both of Pa.

[73] Assignee: Westinghouse Electric Corporation, Pittsburgh, Pa.

[21] Appl. No.: 603,611

[22] Filed: Aug. 11, 1975

[51] Int. Cl.[2] .......... B23K 9/00

[52] U.S. Cl. .......... 219/121 P; 219/74; 219/383

[58] Field of Search .......... 219/121 P, 383, 74; 315/111.2; 313/231.3, 231.4

[56] References Cited

U.S. PATENT DOCUMENTS

| | | | |
|---|---|---|---|
| 3,140,421 | 7/1964 | Spongberg | 219/121 P |
| 3,248,513 | 4/1966 | Sunnen | 219/121 P X |
| 3,283,205 | 11/1966 | Bolt | 315/111.2 |
| 3,373,306 | 3/1968 | Karlovitz | 219/121 P X |
| 3,541,297 | 11/1970 | Sunnen et al. | 219/121 P |
| 3,578,943 | 5/1971 | Schoumaker | 219/121 P |
| 3,760,151 | 9/1973 | Wolf et al. | 219/383 |
| 3,869,593 | 3/1975 | New et al. | 219/121 P |

*Primary Examiner*—J. V. Truhe
*Assistant Examiner*—Fred E. Bell
*Attorney, Agent, or Firm*—L. P. Johns

[57] ABSTRACT

A three-phase arc heater system characterized by two axially spaced, sustantially cylindrical electrodes forming a first intermediate gap, a third electrode forming a second intermediate gap upstream of the first gap, means for channeling gas to the first and second gap, and a three-phase delta-connected power source having a ground conductor connected to the downstream electrode.

4 Claims, 3 Drawing Figures

THREE-PHASE ARC HEATER

CROSS-REFERENCE TO RELATED APPLICATION

This invention is related to the invention disclosed in the application of M. G. Fey, Ser. No. 603,579, filed Aug. 11, 1975.

BACKGROUND OF THE INVENTION

1.Field of the Invention:

This invention relates to a three-phase arc heater system.

2. Description of the Prior Art:

Many different types of arc heaters have been disclosed which use both alternating current and direct current and which have been described as being suitable for three-phase arc heating. One of the problems encountered in the operation of a single-phase arc heater for any process is the widely varying temperature and velocity of the effluent gas which causes a low efficiency of product reaction or melting. Another problem is that in many cases the supply transformer cannot conveniently handle the unbalanced loading.

SUMMARY OF THE INVENTION

It has been found in accordance with this invention that the foregoing problems may be overcome by providing a three-phase arc heater system as a high energy heat source comprising an arc heater having two axially spaced, substantially cylindrical elelectrodes forming a first intermediate gap therebetween, one electrode comprising a downstream electrode and the other electrode comprising an upstream electrode, a third electrode disposed upstream of the intermediate gap, the upstream electrode and the third electrode forming a second intermediate gap therebetween, first and second means spacing and electrically insulating the downstream and upstream electrodes and the upstream and third electrodes respectively, means for channeling gas to be heated at a high velocity to the gaps, a three-phase delta-connected power source comprising a conductor for each phase and connected separately to the electrodes, and a ground conductor connected to the downstream electrode. It is preferred that the third electrode be cylindrical.

The advantage of the arc heater system of this invention is that it is an improvement over single-phase arc heaters by the addition of an electrode or electrodes to existing single-phase design and provides for balancing of power supply phase loading and more uniform arc heater outlet gas temperatures and velocities.

DESCRIPTION OF THE PREFERRED EMBODIMENTS

Figure 1:
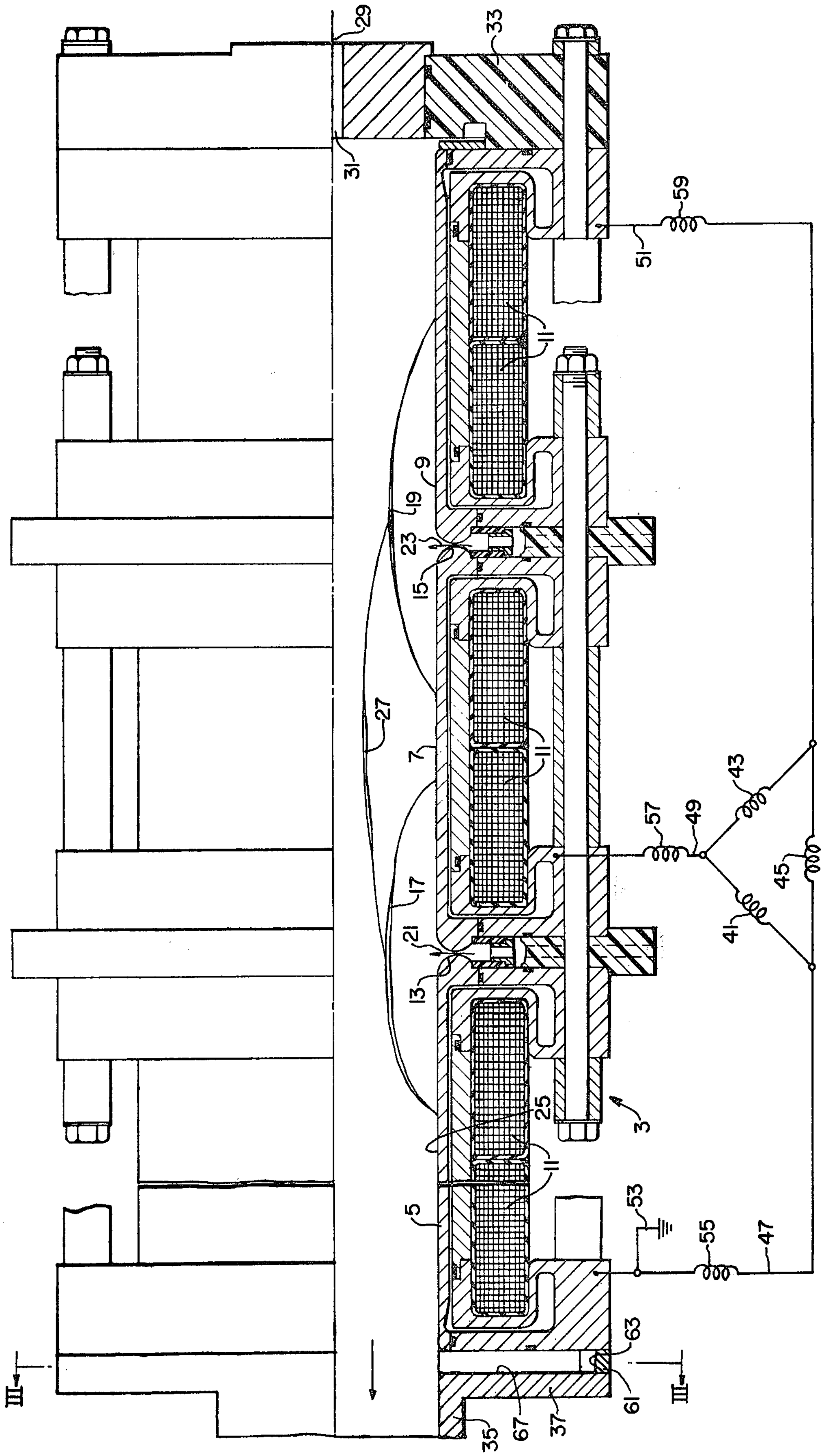
FIG. 1 is a sectional view, partially in elevation, showing the arc heater apparatus according to one embodiment thereof.

A three-phase arc heater is generally indicated at 3 in FIG. 1 and is substantially similar in construction to that disclosed in U.S. Pat. No. 3,765,870, entitled "Method of Direct Ore Reduction Using A Short Gap Arc Heater" of which the inventors are Maurice G. Fey and George A. Kemeny. Because of the full disclosure in that patent description of the arc heater 3 is limited herein to the basic structure and operation. The arc heater 3 differs from that of said patent in that it comprises three (instead of two) cylindrical copper electrodes 5, 7, 9 which are designated, respectively, as downstream, intermediate, and upstream electrodes.

Each electrode 5, 7, 9 includes a plurality of internally mounted field coils 11. A space or gap 13 is disposed between the electrodes 5 and 7, and a space or gap 15 is disposed between the electrodes 7 and 9. Each gap 13, 15 is about 1 millimeter. When a power source of about 4 kV is applied to the arc heater 3, an arc occurs in each gap 13, 15 and incoming stock gas 21, 23 immediately blows the arcs 17, 19 into the interior of the arc heater chamber 25. The arc heater 3 comprises the three electrodes 5, 7, 9, one for each of the three phases of AC power supply. For one phase cycle the arc 17 extends between the electrodes 5 and 7; for another phase of the cycle the arc 17 extends between the electrodes 7 and 9; and for a third phase of the cycle an arc 27 extends between the electrodes 5 and 9. The combined arcs rotate in the arc chamber 25 at a speed of about 1000 revolutions per second by interaction of the arc current and the DC magnetic field set up in the internally mounted field coils 11, resulting in a very high operating efficiency for this type of equipment. As a gas 21, 23 enters the arc heater chamber it may be mixed with feed stock 29 introduced through an inlet port 31 of an end plate 33, and move downstream to the arc chamber 25 to an outlet port 35 and into a reactor or receptacle 36. Radially disposed inlets 37 may be provided between the downstream electrode 5 and the outlet port for the introduction of other materials, such as a coolant gas 39, where necessary.

The electric circuit by which the three-phase arcing phenomenon functions includes a delta-connected power system comprising windings 41, 43, 45 which are secondary windings of an output transformer having conventional primary windings from an AC source. Three conductors 47, 49, 51 extend from the junction of the delta circuit to the electrodes 5, 7, and 9, respectively. The downstream conductor 47 is grounded at 53. In addition, the conductors 47, 49, 51 include current limiting reactors 55, 57, 59, respectively. Accordingly, for one phase of the AC cycle the current flows through the coil 41, the current limiting reactor 57, the intermediate electrode 7, the arc 17, the downstream electrode 5, the reactor 55, the conductor 47, and the coil 45. The next phase of the cycle includes a combination of another pair of electrodes so that the arcs 19, 27 flashes intermittently between two of the three electrodes and passes through the arc chamber 25 substantially as shown in FIG. 1.

Moreover, the individual phase voltages may be different because the arc length may be different and because arc-to-gas heat transfer may be different. Phase power can be balanced by adjusting the arc current in the individual phases. For example, the phase with the lowest arc voltage should have the lowest series reactance and therefore operate at the highest current. It is desirable to balance the phase power, first, to fully utilize the supply transformer, and second, to achieve nearly uniform outlet gas temperature and velocities. Normally feed stock particulate matter or process gas or quench gas would be admitted to the hot stream at the exit of the arc heater at a steady feed rate. To achieve maximum efficiency it is desirable that the gas exiting the arc heater to this feeding area be of uniform temperature and velocity.

Figure 3:
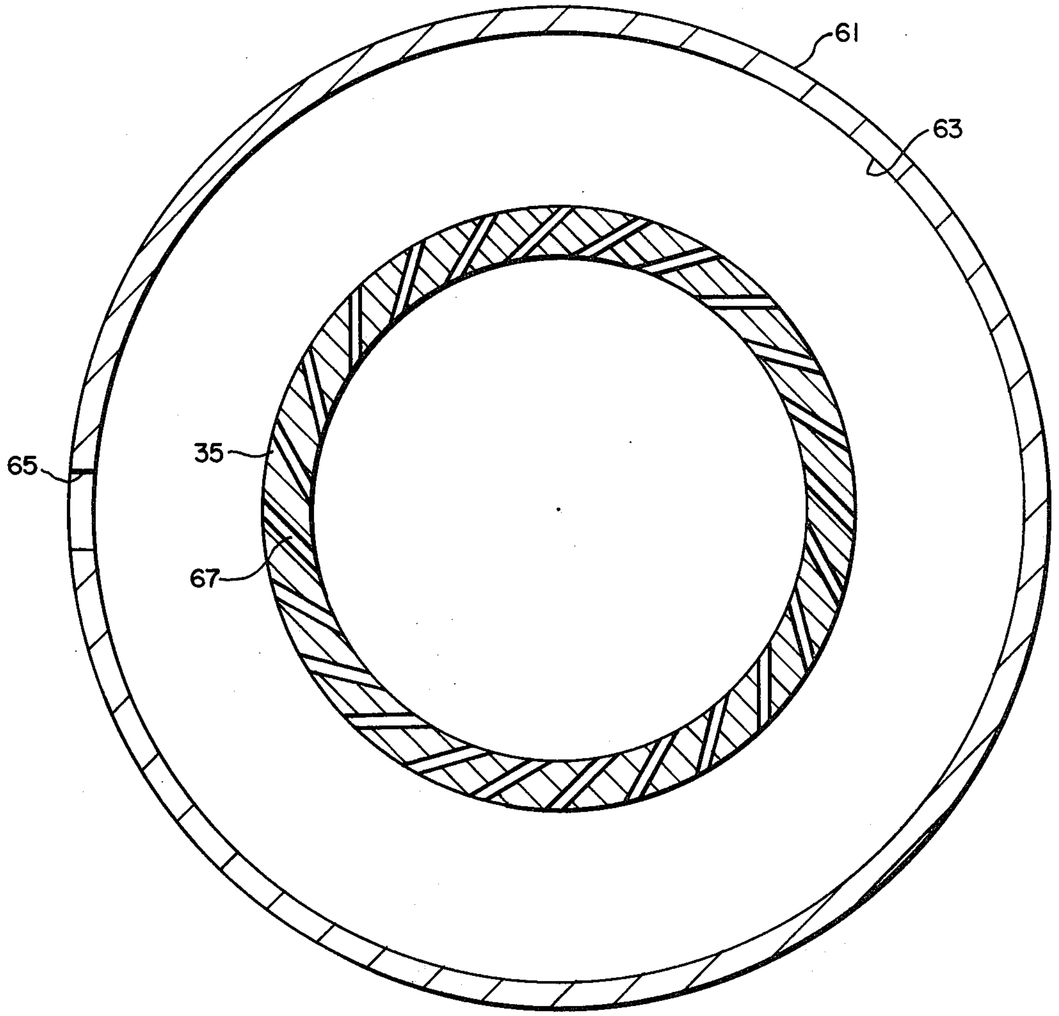
FIG. 3 is a sectional view taken on the line III—III of FIG. 1.

The arc heater 3 may also include structure to control swirl of the gases exiting from the arc heater. By varying the flow rate and the direction of flow in the individual electrode gaps, it is possible to achieve a low or high net swirl at the outlet port 35 by providing slotted manifold rings 61 (FIG. 3) in each of the gas admission manifolds. The ring 61 includes an annular manifold 63 having an inlet 65 and a plurality of peripherally spaced tangentially extending slots 67 through which gas passes from the manifold to the outlet port 35 in a tangential direction rather than radially, thereby imparting a rotating or swirling movement to the product exiting from the arc heater chamber 25. Although the swirling motion is not desirable for all processes for which the arc heater is used, it is desirable in some processes for melted materials to collect and run down the walls of a reactor or receptacle 33 into which the outlet port 35 leads as the reaction is completed and product collection and separation from the gases become simplified. For example, a gas introduced through slot 67 may be a coolant gas collection of molten particles on the downstream walls.

Figure 2:
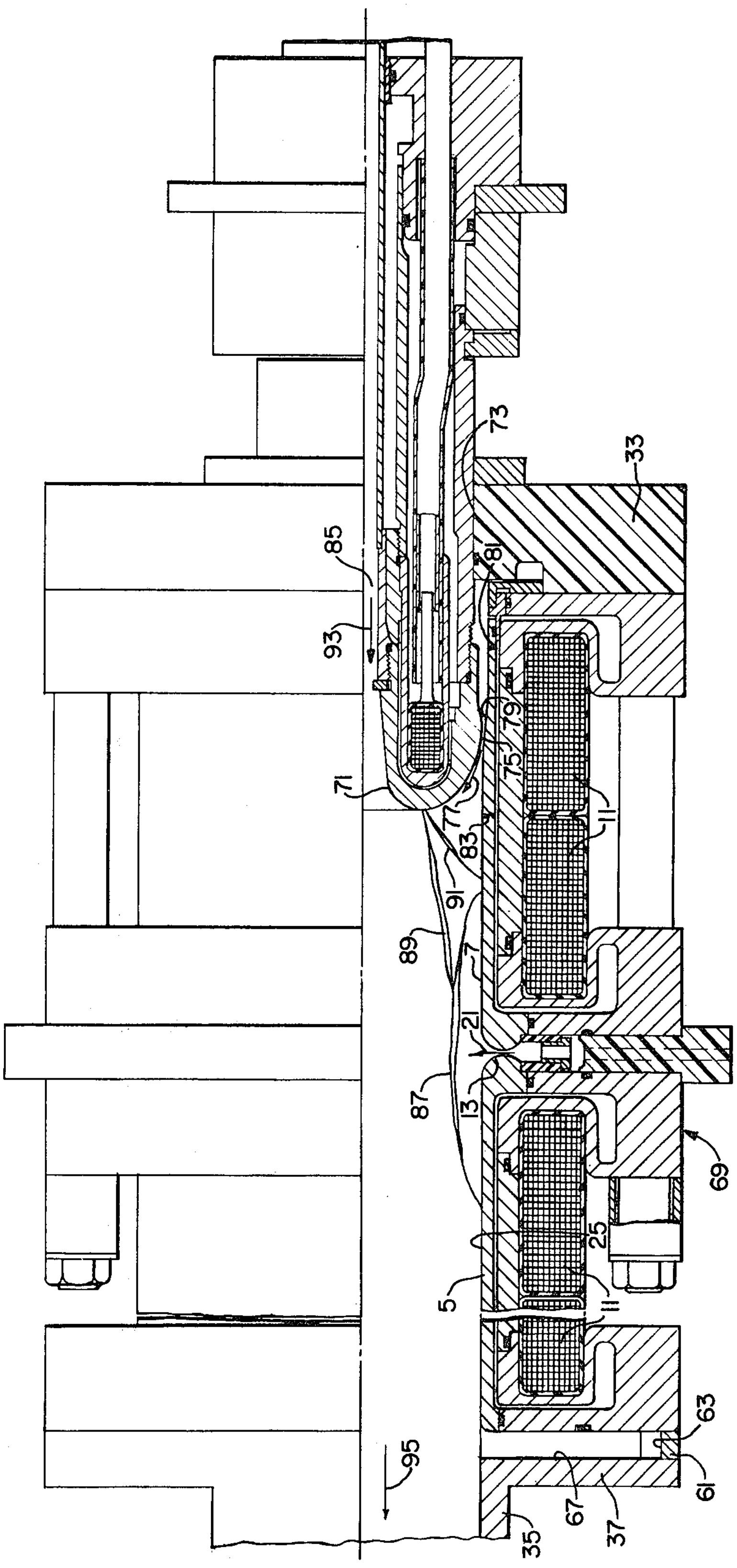
FIG. 2 is a sectional view of another embodiment of the electrode arrangement.

Another embodiment of the invention is generally indicated at 69 in FIG. 2 in which parts similar to those of FIG. 1 are indentified with corresponding reference numbers for simplicity. The arc heater 69 differs primarily from the arc heater 3 in that the upstream electrode 71 is a toroidal or cylindrical member extending telescopically into the upper end of the intermediate electrode 7. The electrode 71 is disposed in an aperture 73 in the insulating end plate 33, whereby the electrodes 7 and 71 are electrically insulated from each other. A small space or gap 75 is provided between the electrodes 7 and 71 for admission of a process gas 77, and for arc initiation. The electrode 71 is movable longitudinally to enable variation of the gap width. For that purpose, a wall portion 79 of the electrode 7 is inclined inwardly in the downstream direction so that the electrode 71 may be moved longitudinally to increase or decrease the dimension of the gap 75 between the electrodes 7 and 71. Thus, the thickness of the walls at the right end of the electrode 7, as indicated by the arrow 81, is less than the thickness of the walls at the left end, as indicated by the arrow 83, as viewed in FIG. 2.

The cylindrical electrode 71 includes a bore 85 through which feed stock, such as gas, fluid, or pulverized particulate material, may be introduced into the arc heater for whatever purpose the arc heater is used. For example, the feed stock may be altered chemically or physically, such as for converting iron ore to elemental iron or physically altering the shape of a material from an irregular surface to a spherical surface, as in the formation of spheroidized magnetite.

In operation, electric arcs 87, 89, 91 occur between pairs of electrodes 5 and 7, 5 and 71, and 7 and 71, respectively, in response to the cyclic operation of the AC power source in manner set forth with regard to the arc heater 3 of FIG. 1. Accordingly, the feed stock entering the arc heater 69 as indicated by the arrow 93 moves into the arc chamber 5 where the interacting phenomenon of chemical and physical forces, provided by the heating effect of the electric arcs, 87, 89, 91 and the reactive gases 21, 75, operate to provide an end product as indicated by the arrow 95 at the outlet port 35.

In conclusion, the three-phase arc heater of this invention provides advantages including balanced phase loading with increased power capability when compared to a single-phase arc heater, a less costly and more compact structure than obtained by employing three single-phase arc heaters, the ability to vary gas flow from zero to full swirl to suit a particular chemical, heating or melting process, and exit gases having uniform outlet temperatures and velocities.

What is claimed is:

1. A three-phase heater system as a high energy heat source, comprising an arc heater having two axially spaced, substantially cylindrical electrodes forming a first intermediate gap therebetween, one electrode comprising a downstream electrode and the other electrode comprising an upstream electrode, a thrid electrode disposed upstream of the intermediate gap, a second intermediate gap between the upstream the electrode and the third electrode, first and second means spacing an elecrically insulating the downstream and upstream electrodes and the upstream and third electrodes, respectively, and comprising means for channeling gas to be heated at a high velocity to the gaps, a three-phase delta-connected power source comprising one conductor for each phase and connected separately to the electrodes, a ground conductor connected to the downstream electrode, a ground conductor connected to the dowsntream electrode, and a gas inlet port disposed at the exit end of the arc heater and having a plurality of peripherally spaced gas inlets extending tangentially to the periphery of a product material flowing from the arc heater, whereby a swirling movement is imparted to the product material.

2. The three-phase arc heater of claim 1 in which the third electrode is cylindrical.

3. The three-phase arc heater of claim 2 in which the third electrode has a smaller diameter than the upstream electrode.

4. The three-phase arc heater of claim 3 in which the third electrode extends telescopically into the upstream electrode.

* * * * *